Figure 1:
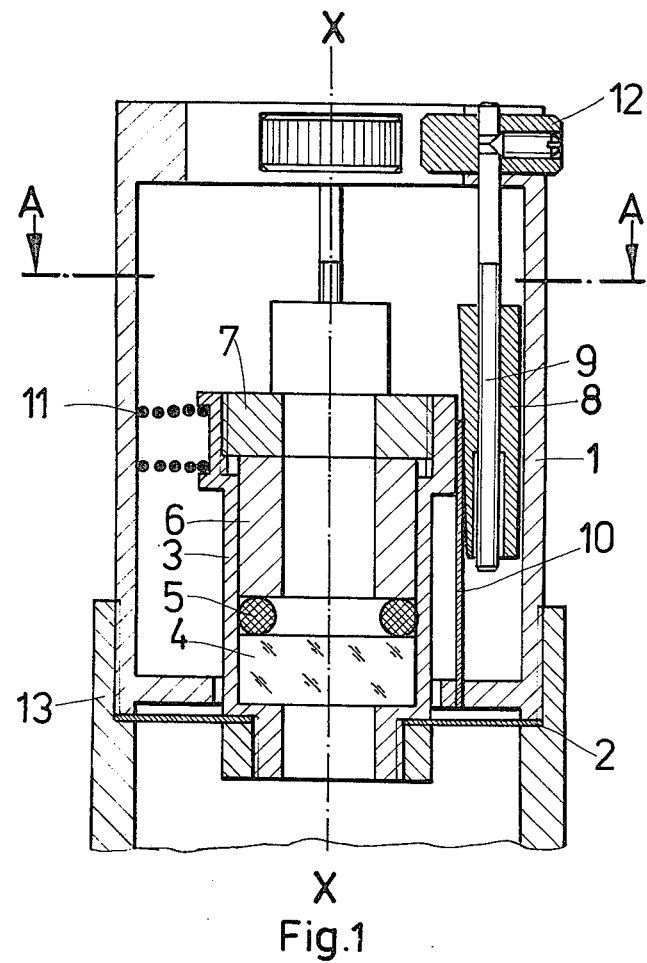

United States Patent [19]

Zipfel

[11] 4,278,324
[45] Jul. 14, 1981

[54] ADJUSTABLE MOUNT FOR OPTICAL COMPONENTS

[76] Inventor: Lothar Zipfel, JENA, 2, Werner-Seelenbinder-Str., District of Gera, German Democratic Rep.

[21] Appl. No.: 84,529

[22] Filed: Oct. 22, 1979

[30] Foreign Application Priority Data

Oct. 31, 1978 [DD] German Democratic Rep. ... 208776

[51] Int. Cl.³ .............................................. G02B 7/00
[52] U.S. Cl. .................................. 350/288; 248/487; 350/310; 331/94.5 D
[58] Field of Search ............... 350/252, 285, 287, 288, 350/310; 331/94.5 C, 94.5 D; 248/476, 479, 487

[56] References Cited

U.S. PATENT DOCUMENTS

| | | | |
|---|---|---|---|
| 3,359,812 | 12/1967 | Everitt | 331/94.5 D X |
| 3,400,596 | 9/1968 | Laich | 331/94.5 D X |
| 3,601,476 | 8/1971 | MacKenzie | 350/288 X |
| 3,751,139 | 8/1973 | Malherbe | 350/288 X |
| 3,764,934 | 10/1973 | Schamberger | 350/285 X |
| 3,864,029 | 2/1975 | Mohler | 331/94.5 C X |

*Primary Examiner*—F. L. Evans

[57] ABSTRACT

The invention relates to an adjustable mount for optical components particularly for use in laser arrangements. In order to obtain an adjustable mount for a tightly sealed optical component, which eliminates any oscillation of and shock effects upon said component, an outer tube includes a coaxial interior tube within which the optical component is non-displaceably mounted. Two wedges, staggered relative to each other by about 90° are arranged between the two tubes and are displaceable along the optical axis of the device by means of two drive spindles thus effecting an angular displacement of the interior tube with the optical component relative to the outer tube. The wedges are frictionally connected to the interior tube wall via guide springs supporting said wedges and to the interior wall of the outer tube via their other faces. The interior tube is pivotally seated in and relative to said outer tube by a spring disc. By operating said spindles a very precise adjustment of the optical component is obtained.

2 Claims, 2 Drawing Figures

ADJUSTABLE MOUNT FOR OPTICAL COMPONENTS

The invention relates to an adjustable mount for optical components, particularly for use in laser. In a previous device for adjusting optical elements as disclosed in the SU Inventor's Certificate 248248, two annular mounts are so constructed that a spherical slide seating results. The adjustable element is arranged in the interior annular mount. Said annular mounts are connected through an annular diaphragm, which functions as a sealing and exerts a resetting force.

The angular position of the element is adjusted by setting screws which are axially arranged. The "Westgerman patent specification being laid open" specifies an adjustment device in which two plates are connected through three differential screws, which serve to adjust the space between the two plates. The differential screws axially arranged at a laser tube are provided with portions of reduced cross-section between the individual threads for permitting the mutual bending of the differential screws due to displacement of the plates.

The U.S. Pat. No. 3,601,476 discloses a further adjustment device for optical components, the latter are supported by an annular mount, which is connected to a base plate via a spring leaf operating as a three-point seating and reset means. Two radially arranged measuring screws vary the position of the annular mount via a conic face. Thus the annular mount is adjusted and therewith the optical component.

A device according to the U.S. Pat. No. 3,864,029 comprises two plates which are connected through spring leaves.

The latter adjust the plates in radial direction relative to the laser and supply the reset-force for three axially aligned plate-spacers, one of which is a pivot seating and the other two are adjustment spindles for mutual adjustment of the two plates.

The above adjustment devices have the common disadvantage that the devices have to be very bulky to realise a high adjustment sensitivity, for example, in the range of <10".

A further disadvantage is the oscillation and temperature sensitivity of the known devices due to the size of the construction.

Still a further disadvantage rises from the fact that a tight sealing, for example, of a laser or vacuum vessel is not ensured when a precision adjustment of the components has to be carried out.

It is an object of the invention to obviate the above disadvantages.

It is a further object of the invention to provide an adjustable and compact mount for optical elements which reduces the effect of external influences. It is still a further object of the invention to provide an adjustable mount for optical elements for seating the latter tightly sealed, non-oscillating, impact-protected and which permits precision adjustment. These and other objects are realised in an adjustable mount for optical elements, in particular for laser, by an angular displaceably seated internal tube provided in an outer tube, the optical element is rigidly mounted in said internal tube.

Two displaceable wedges staggered relative to each other by 90° and displaceable along the optical axis are arranged in the outer tube and cooperate with two guide springs. The wedges are displaceable through spindles which are seated in the outer tube. The wedges are frictionally connected with the wedge faces to the interior tube via the guide springs and rest upon the interior wall of the outer tube with those faces which are oppositely located in said wedge faces.

Advantageously, the interior tube is seated in the outer tube by means of a spring disc which serves as a pivot.

Pressure responsive resilient elements are arranged between the outer tube and the interior tube in diametrical opposition to the wedges.

The inventional mount reduces the size of a device particularly in radial direction, that is perpendicularly to the optical axis, and also involves of reduction of weight.

Furthermore, the adjustment is rendered more sensitive and the adjustment range is increased. The inclination to oscillation and the sensitivity towards temperature are reduced.

The screening of internal rays towards outside, for example, of a laser is improved.

Figure 2:
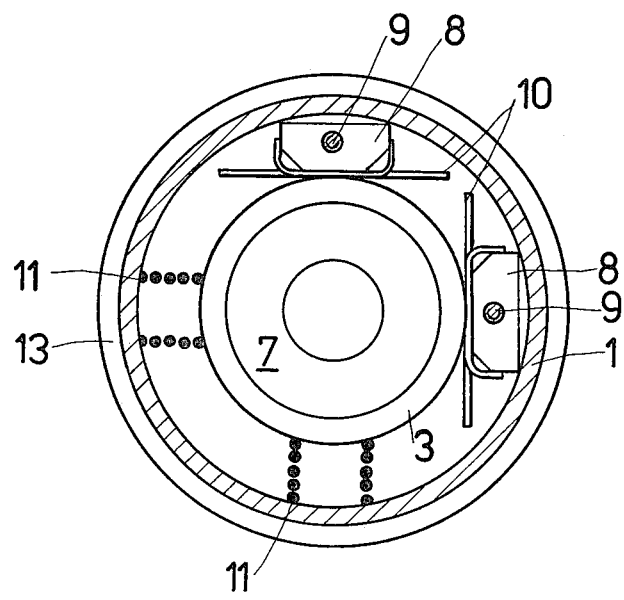

In order that the invention may be more readily understood reference is made to the accompanying drawings which illustrate diagrammatically and by way of example one embodiment thereof and where FIG. 1 is a longitudinal section of the inventional mount, and FIG. 2 a section along line A—A of the mount of FIG. 1.

The inventional mount as shown in FIGS. 1 and 2 comprises an external tube 1 in which a spring disc 2, which serves as a pivot, is arranged. The optical component 4, for example, a laser reflector which has to be adjusted, is arrested centrally via a sealing ring 5, a pressure ring 6 and a threaded ring 7 in the interior tube 3, the reflecting face being arranged substantially in a plane with the spring disc 2.

It is also feasible to seal or cement the component 4 to the interior tube 3 to obtain a tight sealing to and a safe rest of the optical component 4 in the interior tube 3.

The wedges 8 staggered relative to each other by 90° are arranged between the outer tube 1 and the interior tube 3.

Each of said wedges 8 meshes via respective means therein with spindles 9 which are axially seated, considered in the direction of the optical axis X—X, in the outer tube 1.

Guide springs 10 arranged in the outer tube 1 are frictionally connected to said wedges 8, at least partially.

The wedges 8 abut against the interior wall of the outer tube 1 with one of their faces. The guide springs 10 are located with those end portions which are remote from the connection of the springs 10 to the outer tube 1 between the other of the wedge 8 faces and the outer wall of the interior tube 3.

Resilient elements 11, for example, cylindrical thrust springs, which are pressure loaded, are arranged diametrically to the respective one of the wedges 8 between the outer tube 1 and the interior tube 3.

Said resilient elements 11 produce radially acting forces which are shock and oscillation absorbing, and which establish a frictional connection of the interior tube 3 to the guide springs 10, the wedges 8 and the outer tube 1 acting as a counter support.

The spindles 9, seated in the outer tube 1 are provided with a knob 12 for operation of the spindles 9 from outside.

In rotating the spindles 9 the wedges 8 are displaced in direction of the optical axis. The axis of the interior tube 3 is angularly displaced relative to the axis of the outer tube 1 via the spring disc 2 serving as a pivot. By virtue of this displacement operation of the spindles 9 the optical component 4 can be set and adjusted relative to the optical axis X—X of the laser arrangement over a wide range.

The adjustable mount can be installed as a unity in the laser arrangement or as an accessory to other optical devices, without any influence on the adjustment of the optical component relative to the outer tube 1.

As shown in FIG. 1 the outer tube 1 is screwed into an attachment piece 13 of a laser arrangement or any other device.

In said mount, the guide spring 10 has the task to eliminate any oscillations and/or shock effects in the course of an adjustment operation thus obviating any undesired axial movements of the interior tube 3 and hence, of the component 4.

The adjustment sensitivity and the adjustment range depend on the size of the wedge angle of the wedges 8, on the pitch thread of the spindles 9 and on the space between the point of pivot and the plane of pressure exerted by the wedges.

I claim:

1. An adjustable mount for optical components, particularly for use in laser arrangements, including a tightly sealed optical component comprising
   an outer tube,
   an interior tube coaxially arranged within said outer tube,
   a spring disc,
      said interior tube supporting said optical component in encompassing the latter, said spring disc for pivotally seating said interior tube in said outer tube,
   an optical axis, coinciding with the tube axes of said interior and outer tube,
   two wedges, each having two wedge faces,
   two guide springs,
   two spindles, each being seated in the wall of said outer tube,
      said two wedges being arranged between said outer tube and said interior tube staggered at right angles to each other, said two wedges being frictionally connected via the one of said two wedge faces and via said guide springs to the outer wall of said interior tube and with the other of said wedge faces to the interior wall of said outer tube,
   said two wedges being provided with a means for receiving said two spindles,
   said two wedges being displaced by operation of said two spindles in parallel to said optical axis,
   said interior tube axis including an angle with the optical axis when displaced.

2. An adjustable mount as claimed in claim 1, wherein spring means are provided between the interior and outer tube for counteracting the displacement operation.

* * * * *